United States Patent
Frank et al.

(10) Patent No.: US 8,176,564 B2
(45) Date of Patent: May 8, 2012

(54) SPECIAL PC MODE ENTERED UPON DETECTION OF UNDESIRED STATE

(75) Inventors: Alexander Frank, Bellevue, WA (US); Curt A. Steeb, Redmond, WA (US); Isaac P. Ahdout, Seattle, WA (US); James S. Duffus, Seattle, WA (US); Martin Hall, Sammamish, WA (US); Nicholas Temple, Renton, WA (US); Rajagopal Venkatachalam, Redmond, WA (US); Thomas Phillips, Bellevue, WA (US); Zhangwei Xu, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 696 days.

(21) Appl. No.: 11/152,214

(22) Filed: Jun. 14, 2005

(65) Prior Publication Data
US 2006/0107329 A1 May 18, 2006

Related U.S. Application Data

(63) Continuation-in-part of application No. 11/022,493, filed on Dec. 22, 2004, which is a continuation-in-part of application No. 11/006,837, filed on Dec. 8, 2004, now abandoned, which is a continuation-in-part of application No. 10/989,122, filed on Nov. 15, 2004, now Pat. No. 7,610,631.

(51) Int. Cl.
*G06F 21/00* (2006.01)
(52) U.S. Cl. ........................................................ 726/27
(58) Field of Classification Search ...................... 726/27
See application file for complete search history.

(56) References Cited

U.S. PATENT DOCUMENTS

| 4,558,176 A | 12/1985 | Arnold et al. |
| 4,620,150 A | 10/1986 | Germer et al. |
| 4,750,034 A | 6/1988 | Lem |
| 4,817,094 A | 3/1989 | Lebizay et al. |
| 4,855,730 A | 8/1989 | Venners et al. |
| 4,855,922 A | 8/1989 | Huddleston et al. |
| 4,857,999 A | 8/1989 | Welsh |
| 4,910,692 A | 3/1990 | Outram |
| 4,959,774 A | 9/1990 | Davis |
| 4,967,273 A | 10/1990 | Greenberg |
| 5,001,752 A | 3/1991 | Fischer |
| 5,012,514 A | 4/1991 | Renton |

(Continued)

FOREIGN PATENT DOCUMENTS
CN 1531673 9/2004
(Continued)

OTHER PUBLICATIONS

Specification of U.S. Appl. No. 10/988,907, filed Nov. 15, 2004.

(Continued)

*Primary Examiner* — Jeffrey D Popham

(57) ABSTRACT

A system and method for monitoring a computer, particularly a pay-per-use computer, uses an isolated computing environment or supervisor. The isolated computing environment boots prior to any boot device associated with an operating system, runs concurrently with the operating system and monitors and measures the computer in operation. Once the isolated computing environment determines the computer is not in compliance with the required policies, the isolated computing environment may either impose an impediment to use such as slowing clock speed or completely disable the operating system. The user may have to return the computer to a service provider to restore it from the offending condition and reset the computer to an operational state.

20 Claims, 5 Drawing Sheets

U.S. PATENT DOCUMENTS

| | | | |
|---|---|---|---|
| 5,249,184 A | 9/1993 | Woest et al. |
| 5,269,019 A | 12/1993 | Peterson et al. |
| 5,274,368 A | 12/1993 | Breeden et al. |
| 5,301,268 A | 4/1994 | Takeda |
| 5,355,161 A | 10/1994 | Bird et al. |
| 5,369,262 A | 11/1994 | Dvorkis et al. |
| 5,406,630 A | 4/1995 | Piosenka et al. |
| 5,414,861 A | 5/1995 | Horning |
| 5,437,040 A | 7/1995 | Campbell |
| 5,442,704 A | 8/1995 | Holtey |
| 5,448,045 A | 9/1995 | Clark |
| 5,459,867 A | 10/1995 | Adams et al. |
| 5,473,692 A | 12/1995 | Davis |
| 5,490,216 A | 2/1996 | Richardson, III |
| 5,500,897 A | 3/1996 | Hartman, Jr. |
| 5,513,319 A | 4/1996 | Finch et al. |
| 5,522,040 A | 5/1996 | Hofsass et al. |
| 5,530,846 A | 6/1996 | Strong |
| 5,552,776 A | 9/1996 | Wade et al. |
| 5,563,799 A | 10/1996 | Brehmer et al. |
| 5,568,552 A | 10/1996 | Davis |
| 5,586,291 A | 12/1996 | Lasker et al. |
| 5,671,412 A | 9/1997 | Christiano |
| 5,710,706 A | 1/1998 | Markl et al. |
| 5,715,403 A | 2/1998 | Stefik |
| 5,724,425 A | 3/1998 | Chang et al. |
| 5,745,879 A | 4/1998 | Wyman |
| 5,763,832 A | 6/1998 | Anselm |
| 5,768,382 A | 6/1998 | Schneier et al. |
| 5,771,354 A | 6/1998 | Crawford |
| 5,774,870 A | 6/1998 | Storey |
| 5,793,839 A | 8/1998 | Farris et al. |
| 5,802,592 A | 9/1998 | Chess |
| 5,825,883 A | 10/1998 | Archibald et al. |
| 5,841,865 A | 11/1998 | Sudia |
| 5,844,986 A | 12/1998 | Davis |
| 5,845,065 A | 12/1998 | Conte et al. |
| 5,875,236 A | 2/1999 | Jankowitz et al. |
| 5,883,670 A | 3/1999 | Sporer et al. |
| 5,892,906 A | 4/1999 | Chou et al. |
| 5,948,061 A | 9/1999 | Merriman |
| 5,953,502 A | 9/1999 | Helbig et al. |
| 5,956,408 A | 9/1999 | Arnold |
| 5,994,710 A | 11/1999 | Knee et al. |
| 6,026,293 A | 2/2000 | Osborn |
| 6,049,789 A | 4/2000 | Frison et al. |
| 6,061,794 A | 5/2000 | Angelo et al. |
| 6,078,909 A | 6/2000 | Knutson |
| 6,119,229 A | 9/2000 | Martinez et al. |
| 6,148,417 A | 11/2000 | Da Silva |
| 6,158,657 A | 12/2000 | Hall, III et al. |
| 6,185,678 B1 | 2/2001 | Arbaugh et al. |
| 6,188,995 B1 | 2/2001 | Garst et al. |
| 6,192,392 B1 | 2/2001 | Ginter |
| 6,233,685 B1 | 5/2001 | Smith |
| 6,243,439 B1 | 6/2001 | Arai et al. |
| 6,253,224 B1 | 6/2001 | Brice, Jr. et al. |
| 6,263,431 B1 | 7/2001 | Lovelace et al. |
| 6,279,111 B1 | 8/2001 | Jensenworth et al. |
| 6,289,319 B1 | 9/2001 | Lockwood et al. |
| 6,295,577 B1 | 9/2001 | Anderson et al. |
| 6,303,924 B1 | 10/2001 | Adan et al. |
| 6,314,409 B2 | 11/2001 | Schneck et al. |
| 6,321,335 B1 | 11/2001 | Chu |
| 6,327,652 B1 | 12/2001 | England et al. |
| 6,330,670 B1 | 12/2001 | England et al. |
| 6,345,294 B1 | 2/2002 | O'Toole et al. |
| 6,363,488 B1 | 3/2002 | Ginter et al. |
| 6,367,017 B1 | 4/2002 | Gray |
| 6,373,047 B1 | 4/2002 | Adan et al. |
| 6,385,727 B1 | 5/2002 | Cassagnol et al. |
| 6,405,923 B1 | 6/2002 | Seysen |
| 6,408,170 B1 | 6/2002 | Schmidt et al. |
| 6,424,714 B1 | 7/2002 | Wasilewski et al. |
| 6,441,813 B1 | 8/2002 | Ishibashi |
| 6,442,529 B1 | 8/2002 | Krishan et al. |
| 6,442,690 B1 | 8/2002 | Howard, Jr. et al. |
| 6,460,140 B1 | 10/2002 | Schoch et al. |
| 6,463,534 B1 | 10/2002 | Geiger et al. |
| 6,496,858 B1 | 12/2002 | Frailong et al. |
| 6,567,793 B1 | 5/2003 | Hicks et al. |
| 6,571,216 B1 | 5/2003 | Garg et al. |
| 6,585,158 B2 | 7/2003 | Norskog |
| 6,587,684 B1 | 7/2003 | Hsu et al. |
| 6,609,201 B1 | 8/2003 | Folmsbee |
| 6,625,729 B1 | 9/2003 | Angelo |
| 6,631,478 B1 | 10/2003 | Wang et al. |
| 6,646,244 B2 | 11/2003 | Aas et al. |
| 6,664,948 B2 | 12/2003 | Crane et al. |
| 6,671,803 B1 | 12/2003 | Pasieka |
| 6,678,828 B1 | 1/2004 | Pham et al. |
| 6,690,556 B2 | 2/2004 | Smola et al. |
| 6,694,000 B2 | 2/2004 | Ung et al. |
| 6,704,873 B1 | 3/2004 | Underwood |
| 6,708,176 B2 | 3/2004 | Strunk et al. |
| 6,711,263 B1 | 3/2004 | Nordenstam et al. |
| 6,716,652 B1 | 4/2004 | Ortlieb |
| 6,738,810 B1 | 5/2004 | Kramer et al. |
| 6,763,458 B1 | 7/2004 | Watanabe |
| 6,765,470 B2 | 7/2004 | Shinzaki |
| 6,791,157 B1 | 9/2004 | Casto et al. |
| 6,816,809 B2 | 11/2004 | Circenis |
| 6,816,900 B1 | 11/2004 | Vogel et al. |
| 6,834,352 B2 | 12/2004 | Shin |
| 6,839,841 B1 | 1/2005 | Medvinsky et al. |
| 6,844,871 B1 | 1/2005 | Hinckley et al. |
| 6,847,942 B1 | 1/2005 | Land et al. |
| 6,851,051 B1 | 2/2005 | Bolle et al. |
| 6,868,433 B1 | 3/2005 | Philyaw |
| 6,871,283 B1 | 3/2005 | Zurko et al. |
| 6,920,567 B1 | 7/2005 | Doherty et al. |
| 6,934,942 B1 | 8/2005 | Chilimbi |
| 6,954,728 B1 | 10/2005 | Kusumoto et al. |
| 6,957,186 B1 | 10/2005 | Guheen et al. |
| 6,976,162 B1 | 12/2005 | Ellison et al. |
| 6,983,050 B1 | 1/2006 | Yacobi et al. |
| 6,986,042 B2 | 1/2006 | Griffin |
| 6,990,174 B2 | 1/2006 | Eskelinen |
| 6,993,648 B2 | 1/2006 | Goodman et al. |
| 7,000,100 B2 | 2/2006 | Lacombe et al. |
| 7,000,829 B1 | 2/2006 | Harris et al. |
| 7,013,384 B2 | 3/2006 | Challener et al. |
| 7,028,149 B2 | 4/2006 | Grawrock |
| 7,054,468 B2 | 5/2006 | Yang |
| 7,069,442 B2 | 6/2006 | Sutton, II |
| 7,069,595 B2 | 6/2006 | Cognigni et al. |
| 7,076,652 B2 | 7/2006 | Ginter et al. |
| 7,096,469 B1 * | 8/2006 | Kubala et al. ................ 718/100 |
| 7,097,357 B2 | 8/2006 | Johnson et al. |
| 7,103,574 B1 | 9/2006 | Peinado et al. |
| 7,113,912 B2 | 9/2006 | Stefik |
| 7,117,183 B2 | 10/2006 | Blair et al. |
| 7,121,460 B1 | 10/2006 | Parsons et al. |
| 7,127,579 B2 | 10/2006 | Zimmer |
| 7,130,951 B1 | 10/2006 | Christie et al. |
| 7,143,297 B2 | 11/2006 | Buchheit et al. |
| 7,162,645 B2 | 1/2007 | Iguchi et al. |
| 7,171,539 B2 | 1/2007 | Mansell et al. |
| 7,174,457 B1 | 2/2007 | England et al. |
| 7,207,039 B2 | 4/2007 | Komarla et al. |
| 7,234,144 B2 | 6/2007 | Wilt et al. |
| 7,236,455 B1 | 6/2007 | Proudler et al. |
| 7,266,569 B2 | 9/2007 | Cutter et al. |
| 7,299,358 B2 | 11/2007 | Chateau et al. |
| 7,353,402 B2 | 4/2008 | Bourne et al. |
| 7,356,709 B2 | 4/2008 | Gunyakti et al. |
| 7,359,807 B2 | 4/2008 | Frank et al. |
| 7,360,253 B2 | 4/2008 | Frank et al. |
| 7,392,429 B2 | 6/2008 | Westerinen et al. |
| 7,395,245 B2 | 7/2008 | Okamoto et al. |
| 7,395,452 B2 | 7/2008 | Nicholson et al. |
| 7,406,446 B2 | 7/2008 | Frank et al. |
| 7,421,413 B2 | 9/2008 | Frank et al. |
| 7,441,121 B2 | 10/2008 | Cutter, Jr. et al. |
| 7,441,246 B2 | 10/2008 | Auerbach et al. |
| 7,461,249 B1 | 12/2008 | Pearson et al. |
| 7,464,103 B2 | 12/2008 | Siu |

| Patent/Pub. No. | Date | Name | Ref. |
|---|---|---|---|
| 7,490,356 B2 * | 2/2009 | Lieblich et al. | 726/25 |
| 7,493,487 B2 | 2/2009 | Phillips et al. | |
| 7,494,277 B2 | 2/2009 | Setala | |
| 7,519,816 B2 | 4/2009 | Phillips et al. | |
| 7,539,863 B2 | 5/2009 | Phillips | |
| 7,540,024 B2 | 5/2009 | Phillips et al. | |
| 7,549,060 B2 | 6/2009 | Bourne et al. | |
| 7,562,220 B2 | 7/2009 | Frank et al. | |
| 7,565,325 B2 | 7/2009 | Lenard | |
| 7,568,096 B2 | 7/2009 | Evans | |
| 7,596,784 B2 | 9/2009 | Abrams | |
| 7,610,631 B2 | 10/2009 | Frank et al. | |
| 7,644,239 B2 | 1/2010 | Westerinen et al. | |
| 7,669,056 B2 | 2/2010 | Frank | |
| 7,694,153 B2 | 4/2010 | Ahdout | |
| 7,770,205 B2 | 8/2010 | Frank | |
| 7,814,532 B2 | 10/2010 | Cromer et al. | |
| 7,877,607 B2 | 1/2011 | Circenis | |
| 7,891,007 B2 | 2/2011 | Waxman et al. | |
| 7,958,029 B1 | 6/2011 | Bobich et al. | |
| 2001/0034711 A1 | 10/2001 | Tashenberg | |
| 2001/0056413 A1 | 12/2001 | Suzuki et al. | |
| 2001/0056539 A1 | 12/2001 | Pavlin et al. | |
| 2002/0002597 A1 | 1/2002 | Morrell, Jr. | |
| 2002/0007310 A1 | 1/2002 | Long | |
| 2002/0023212 A1 | 2/2002 | Proudler | |
| 2002/0046098 A1 | 4/2002 | Maggio | |
| 2002/0055906 A1 | 5/2002 | Katz et al. | |
| 2002/0091569 A1 | 7/2002 | Kitaura et al. | |
| 2002/0107701 A1 | 8/2002 | Batty et al. | |
| 2002/0111916 A1 | 8/2002 | Coronna et al. | |
| 2002/0112171 A1 | 8/2002 | Ginter et al. | |
| 2002/0123964 A1 * | 9/2002 | Kramer et al. | 705/40 |
| 2002/0124212 A1 | 9/2002 | Nitschke et al. | |
| 2002/0129359 A1 | 9/2002 | Lichner | |
| 2002/0138549 A1 | 9/2002 | Urien | |
| 2002/0141451 A1 | 10/2002 | Gates et al. | |
| 2002/0144131 A1 | 10/2002 | Spacey | |
| 2002/0147601 A1 | 10/2002 | Fagan | |
| 2002/0147782 A1 | 10/2002 | Dimitrova et al. | |
| 2002/0147912 A1 | 10/2002 | Shmueli et al. | |
| 2002/0178071 A1 | 11/2002 | Walker et al. | |
| 2002/0184482 A1 | 12/2002 | Lacombe et al. | |
| 2002/0184508 A1 * | 12/2002 | Bialick et al. | 713/182 |
| 2002/0193101 A1 | 12/2002 | McAlinden | |
| 2002/0194132 A1 | 12/2002 | Pearson et al. | |
| 2003/0005135 A1 | 1/2003 | Inoue et al. | |
| 2003/0014323 A1 | 1/2003 | Scheer | |
| 2003/0027549 A1 | 2/2003 | Kiel et al. | |
| 2003/0028454 A1 | 2/2003 | Ooho et al. | |
| 2003/0035409 A1 | 2/2003 | Wang et al. | |
| 2003/0037246 A1 | 2/2003 | Goodman et al. | |
| 2003/0040960 A1 | 2/2003 | Eckmann | |
| 2003/0046026 A1 * | 3/2003 | Levy et al. | 702/181 |
| 2003/0048473 A1 | 3/2003 | Rosen | |
| 2003/0056107 A1 | 3/2003 | Cammack et al. | |
| 2003/0084104 A1 | 5/2003 | Salem et al. | |
| 2003/0084278 A1 | 5/2003 | Cromer et al. | |
| 2003/0084285 A1 | 5/2003 | Cromer et al. | |
| 2003/0084337 A1 | 5/2003 | Simionescu et al. | |
| 2003/0084352 A1 | 5/2003 | Schwartz et al. | |
| 2003/0088500 A1 | 5/2003 | Shinohara et al. | |
| 2003/0093694 A1 | 5/2003 | Medvinsky et al. | |
| 2003/0097596 A1 | 5/2003 | Muratov et al. | |
| 2003/0110388 A1 | 6/2003 | Pavlin et al. | |
| 2003/0115458 A1 | 6/2003 | Song | |
| 2003/0126519 A1 | 7/2003 | Odorcic | |
| 2003/0131252 A1 | 7/2003 | Barton et al. | |
| 2003/0135380 A1 | 7/2003 | Lehr et al. | |
| 2003/0149671 A1 | 8/2003 | Yamamoto et al. | |
| 2003/0156572 A1 | 8/2003 | Hui et al. | |
| 2003/0156719 A1 | 8/2003 | Cronce | |
| 2003/0163383 A1 | 8/2003 | Engelhart | |
| 2003/0163712 A1 | 8/2003 | LaMothe et al. | |
| 2003/0172376 A1 | 9/2003 | Coffin, III et al. | |
| 2003/0185395 A1 | 10/2003 | Lee et al. | |
| 2003/0188165 A1 | 10/2003 | Sutton et al. | |
| 2003/0196102 A1 | 10/2003 | McCarroll | |
| 2003/0196106 A1 | 10/2003 | Erfani et al. | |
| 2003/0208338 A1 | 11/2003 | Challener et al. | |
| 2003/0208573 A1 | 11/2003 | Harrison et al. | |
| 2003/0229702 A1 | 12/2003 | Hensbergen et al. | |
| 2004/0001088 A1 | 1/2004 | Stancil et al. | |
| 2004/0003190 A1 | 1/2004 | Childs et al. | |
| 2004/0003288 A1 * | 1/2004 | Wiseman et al. | 713/201 |
| 2004/0010440 A1 | 1/2004 | Lenard et al. | |
| 2004/0019456 A1 | 1/2004 | Circenis | |
| 2004/0023636 A1 | 2/2004 | Gurel et al. | |
| 2004/0030912 A1 | 2/2004 | Merkle, Jr. et al. | |
| 2004/0034816 A1 * | 2/2004 | Richard | 714/39 |
| 2004/0039916 A1 | 2/2004 | Aldis et al. | |
| 2004/0039924 A1 | 2/2004 | Baldwin et al. | |
| 2004/0039960 A1 | 2/2004 | Kassayan | |
| 2004/0044629 A1 | 3/2004 | Rhodes et al. | |
| 2004/0054907 A1 | 3/2004 | Chateau et al. | |
| 2004/0054908 A1 | 3/2004 | Circenis et al. | |
| 2004/0054909 A1 | 3/2004 | Serkowski et al. | |
| 2004/0064707 A1 | 4/2004 | McCann et al. | |
| 2004/0067746 A1 | 4/2004 | Johnson | |
| 2004/0073670 A1 | 4/2004 | Chack et al. | |
| 2004/0088548 A1 | 5/2004 | Smetters et al. | |
| 2004/0093371 A1 | 5/2004 | Burrows et al. | |
| 2004/0093508 A1 | 5/2004 | Foerstner et al. | |
| 2004/0107359 A1 * | 6/2004 | Kawano et al. | 713/200 |
| 2004/0107368 A1 | 6/2004 | Colvin | |
| 2004/0123127 A1 | 6/2004 | Teicher et al. | |
| 2004/0125755 A1 | 7/2004 | Roberts | |
| 2004/0128251 A1 * | 7/2004 | Adam et al. | 705/59 |
| 2004/0133794 A1 | 7/2004 | Kocher et al. | |
| 2004/0139027 A1 | 7/2004 | Molaro | |
| 2004/0193919 A1 | 9/2004 | Dabbish et al. | |
| 2004/0199769 A1 | 10/2004 | Proudler | |
| 2004/0205357 A1 | 10/2004 | Kuo et al. | |
| 2004/0220858 A1 | 11/2004 | Maggio | |
| 2004/0225894 A1 | 11/2004 | Colvin | |
| 2004/0255000 A1 | 12/2004 | Simionescu et al. | |
| 2004/0268120 A1 | 12/2004 | Mirtal et al. | |
| 2005/0015343 A1 | 1/2005 | Nagai et al. | |
| 2005/0021944 A1 | 1/2005 | Craft et al. | |
| 2005/0028000 A1 | 2/2005 | Bulusu et al. | |
| 2005/0033747 A1 | 2/2005 | Wittkotter | |
| 2005/0039013 A1 | 2/2005 | Bajikar et al. | |
| 2005/0044197 A1 | 2/2005 | Lai | |
| 2005/0050355 A1 | 3/2005 | Graunke | |
| 2005/0060388 A1 | 3/2005 | Tatsumi et al. | |
| 2005/0065880 A1 | 3/2005 | Amato et al. | |
| 2005/0080701 A1 | 4/2005 | Tunney et al. | |
| 2005/0091104 A1 | 4/2005 | Abraham | |
| 2005/0097204 A1 | 5/2005 | Horowitz et al. | |
| 2005/0102181 A1 | 5/2005 | Scroggie et al. | |
| 2005/0108547 A1 | 5/2005 | Sakai | |
| 2005/0108564 A1 | 5/2005 | Freeman et al. | |
| 2005/0120251 A1 | 6/2005 | Fukumori | |
| 2005/0125673 A1 | 6/2005 | Cheng et al. | |
| 2005/0129296 A1 | 6/2005 | Setala | |
| 2005/0132150 A1 | 6/2005 | Jewell et al. | |
| 2005/0138370 A1 | 6/2005 | Goud et al. | |
| 2005/0138389 A1 | 6/2005 | Catherman et al. | |
| 2005/0138423 A1 * | 6/2005 | Ranganathan | 713/201 |
| 2005/0141717 A1 | 6/2005 | Cromer et al. | |
| 2005/0144099 A1 | 6/2005 | Deb et al. | |
| 2005/0166051 A1 | 7/2005 | Buer | |
| 2005/0182921 A1 | 8/2005 | Duncan | |
| 2005/0182940 A1 | 8/2005 | Sutton | |
| 2005/0188843 A1 | 9/2005 | Edlund et al. | |
| 2005/0203801 A1 | 9/2005 | Morgenstern et al. | |
| 2005/0213761 A1 | 9/2005 | Walmsley et al. | |
| 2005/0216577 A1 | 9/2005 | Durham et al. | |
| 2005/0221766 A1 | 10/2005 | Brizek et al. | |
| 2005/0235141 A1 | 10/2005 | Ibrahim et al. | |
| 2005/0240533 A1 | 10/2005 | Cutter et al. | |
| 2005/0246521 A1 | 11/2005 | Bade et al. | |
| 2005/0246525 A1 | 11/2005 | Bade et al. | |
| 2005/0246552 A1 | 11/2005 | Bade et al. | |
| 2005/0257073 A1 | 11/2005 | Bade | |
| 2005/0275866 A1 | 12/2005 | Corlett | |
| 2005/0278519 A1 | 12/2005 | Luebke et al. | |
| 2005/0279827 A1 | 12/2005 | Mascavage et al. | |

| | | | |
|---|---|---|---|
| 2005/0286476 A1 | 12/2005 | Crosswy et al. | |
| 2005/0289177 A1 | 12/2005 | Hohmann, II | |
| 2005/0289343 A1 | 12/2005 | Tahan | |
| 2006/0010326 A1 | 1/2006 | Bade et al. | |
| 2006/0015717 A1 | 1/2006 | Liu et al. | |
| 2006/0015718 A1 | 1/2006 | Liu et al. | |
| 2006/0015732 A1 | 1/2006 | Liu | |
| 2006/0020784 A1 | 1/2006 | Jonker et al. | |
| 2006/0026418 A1 | 2/2006 | Bade | |
| 2006/0026419 A1 | 2/2006 | Arndt et al. | |
| 2006/0026422 A1 | 2/2006 | Bade et al. | |
| 2006/0055506 A1 | 3/2006 | Nicolas | |
| 2006/0072748 A1 | 4/2006 | Buer | |
| 2006/0072762 A1 | 4/2006 | Buer | |
| 2006/0074600 A1* | 4/2006 | Sastry et al. | 702/187 |
| 2006/0075014 A1 | 4/2006 | Tharappel et al. | |
| 2006/0075223 A1 | 4/2006 | Bade et al. | |
| 2006/0085634 A1 | 4/2006 | Jain et al. | |
| 2006/0085637 A1 | 4/2006 | Pinkas | |
| 2006/0085844 A1 | 4/2006 | Buer et al. | |
| 2006/0089917 A1 | 4/2006 | Strom et al. | |
| 2006/0090084 A1 | 4/2006 | Buer | |
| 2006/0100010 A1 | 5/2006 | Gatto et al. | |
| 2006/0106845 A1 | 5/2006 | Frank et al. | |
| 2006/0106920 A1 | 5/2006 | Steeb et al. | |
| 2006/0107306 A1 | 5/2006 | Thirumalai et al. | |
| 2006/0107328 A1 | 5/2006 | Frank et al. | |
| 2006/0107335 A1 | 5/2006 | Frank et al. | |
| 2006/0112267 A1 | 5/2006 | Zimmer et al. | |
| 2006/0117177 A1 | 6/2006 | Buer | |
| 2006/0129824 A1 | 6/2006 | Hoff et al. | |
| 2006/0130130 A1 | 6/2006 | Kablotsky | |
| 2006/0143431 A1 | 6/2006 | Rothman et al. | |
| 2006/0165005 A1 | 7/2006 | Frank et al. | |
| 2006/0168664 A1 | 7/2006 | Frank et al. | |
| 2006/0206618 A1 | 9/2006 | Zimmer et al. | |
| 2006/0213997 A1 | 9/2006 | Frank et al. | |
| 2006/0282319 A1 | 12/2006 | Maggio | |
| 2006/0282899 A1 | 12/2006 | Raciborski | |
| 2007/0033102 A1 | 2/2007 | Frank et al. | |
| 2007/0280422 A1 | 12/2007 | Setala | |
| 2009/0070454 A1 | 3/2009 | McKinnon, III et al. | |

FOREIGN PATENT DOCUMENTS

| | | |
|---|---|---|
| EP | 0635790 | 1/1995 |
| EP | 0843449 | 5/1998 |
| EP | 1061465 | 12/2000 |
| EP | 1085396 | 3/2001 |
| EP | 1387237 | 2/2004 |
| EP | 1429224 | 6/2004 |
| EP | 1223722 | 8/2004 |
| EP | 1460514 | 9/2004 |
| EP | 1233337 | 8/2005 |
| GB | 2359969 | 9/2001 |
| GB | 2378780 | 2/2003 |
| JP | H0535461 | 2/1993 |
| JP | H0635718 | 2/1994 |
| JP | H07036559 | 2/1995 |
| JP | H07141153 | 6/1995 |
| JP | H086729 | 1/1996 |
| JP | 2001526550 | 5/1997 |
| JP | H09185504 | 7/1997 |
| JP | H9251494 | 9/1997 |
| JP | 2000293369 | 10/2000 |
| JP | 2001051742 | 2/2001 |
| JP | 2003510684 | 3/2001 |
| JP | 2001101033 | 4/2001 |
| JP | 2003510713 | 4/2001 |
| JP | 2001184472 | 7/2001 |
| JP | 2001312325 | 11/2001 |
| JP | 2001331229 | 11/2001 |
| JP | 2001338233 | 12/2001 |
| JP | 2002108478 | 4/2002 |
| JP | 2002108870 | 4/2002 |
| JP | 2002374327 | 12/2002 |
| JP | 2003507785 | 2/2003 |
| JP | 2003140761 | 5/2003 |
| JP | 2003140762 | 5/2003 |
| JP | 2003157335 | 5/2003 |
| JP | 2003208314 | 7/2003 |
| JP | 2003248522 | 9/2003 |
| JP | 2003296487 | 10/2003 |
| JP | 2002182562 | 1/2004 |
| JP | 2004062561 | 2/2004 |
| JP | 2004118327 | 4/2004 |
| JP | 2004164491 | 6/2004 |
| JP | 2004-304755 | 10/2004 |
| JP | 2004295846 | 10/2004 |
| JP | 2007525774 | 9/2007 |
| JP | H08-054952 | 2/2011 |
| KP | 20010000805 | 1/2001 |
| KP | 20020037453 | 5/2002 |
| KP | 20050008439 | 1/2005 |
| KP | 20050021782 | 3/2005 |
| WO | WO-9721162 | 6/1997 |
| WO | WO-9811478 | 3/1998 |
| WO | WO-0054126 | 9/2000 |
| WO | WO-0135293 | 5/2001 |
| WO | WO-0145012 | 6/2001 |
| WO | WO-0163512 | 8/2001 |
| WO | WO-0177795 | 10/2001 |
| WO | WO-0193461 | 12/2001 |
| WO | WO-0208969 | 1/2002 |
| WO | WO-02056155 | 7/2002 |
| WO | WO-02103495 | 12/2002 |
| WO | WO-03009115 | 1/2003 |
| WO | WO-03030434 | 4/2003 |
| WO | WO-03073688 | 9/2003 |
| WO | WO-03107585 | 12/2003 |
| WO | WO-03107588 | 12/2003 |
| WO | WO-2004092886 | 10/2004 |
| WO | WO-2007032974 | 3/2007 |

OTHER PUBLICATIONS

International Search Report for PCT/US2006/034622 mailed Jan. 16, 2007.

Written Opinion for PCT/US2006/034622 mailed Jan. 16, 2007.

"International Search Report", mailed Date:Oct. 1, 2008, Application No. PCT/US05/40940, filed Date: Nov. 12, 2005, pp. 11.

"Non-Final Office Action mailed Mar. 17, 2011", U.S. Appl. No. 11/022,493, 11 pages.

"Final Office Action mailed Jun. 18, 2010", U.S. Appl. No. 11/022,493, 13 pages.

"Non-Final Office Action mailed May 27, 2009", U.S. Appl. No. 11/022,493, 13 pages.

"Advisory Action mailed Sep. 10, 2008", U.S. Appl. No. 11/022,493, 2 pages.

"Final Office Action mailed Jun. 11, 2008", U.S. Appl. No. 11/022,493, 12 pages.

"Advisory Action mailed Jul. 12, 2007", U.S. Appl. No. 11/022,493, 3 pages.

"Final Office Action mailed Mar. 30, 2007", U.S. Appl. No. 11/022,493, 9 pages.

"International Search Report and Written Opinion mailed Nov. 30, 2006", Application Serial No. PCT/US05/40950, 8 pages.

"Non-Final Office Action mailed Oct. 5, 2006", U.S. Appl. No. 11/022,493, 11 pages.

"Advisory Action mailed Jan. 31, 2011", U.S. Appl. No. 11/006,837, 3 pages.

"Final Office Action mailed Nov. 18, 2010", U.S. Appl. No. 11/006,837, 22 pages.

"Non-Final Office Action mailed May 12, 2010", U.S. Appl. No. 11/006,837, 27 pages.

"Advisory Action mailed Mar. 1, 2010", U.S. Appl. No. 11/006,837, 3 pages.

"Final Office Action mailed Nov. 10, 2009", U.S. Appl. No. 11/006,837, 24 pages.

"Non-Final Office Action mailed Apr. 10, 2009", U.S. Appl. No. 11/006,837, 18 pages.

"Notice of Allowance mailed Jun. 18, 2009", U.S. Appl. No. 10/989,122, 14 pages.

"Non-Final Office Action mailed Feb. 4, 2009", U.S. Appl. No. 10/989,122, 13 pages.

"Non-Final Office Action mailed Aug. 6, 2008", U.S. Appl. No. 10/989,122, 12 pages.
"Non-Final Office Action mailed Jan. 16, 2008", U.S. Appl. No. 10/989,122, 10 pages.
"Final Office Action mailed Mar. 28, 2007", U.S. Appl. No. 10/989,122, 22 pages.
Qiao, Daji et al., "MiSer: An Optimal Low-Energy Transmission Strategy for IEEE 802.11 a/h", *obtained from ACM*, (Sep. 2003),pp. 161-175.
"Non-Final Office Action mailed Aug. 24, 2006", U.S. Appl. No. 10/989,122, 20 pages.
"International Search Report and Written Opinion mailed Apr. 22, 2008", *Application No. PCT/US2007/087960*, 7 pages.
Eren, H. et al., "Fringe-Effect Capacitive Proximity Sensors for Tamper Proof Enclosures", *Proceedings of 2005 Sensors for Industry Conference*, (Feb. 2005),pp. 22-25.
"International Search Report and Written Opinion mailed Nov. 15, 2004", *Application No. PCT/US05/40966*, 9 pages.
Schneier, B. "Applied Cryptography, Second Edition: Protocols, Algorithms, and Source Code in C (cloth)", (Jan. 1, 1996),13 pages.
Goering, Richard "Web Venture Offers Metered Access to EDA Packages—Startup Winds Clocks by the Hour Tools (E*CAD Will Launch Web Site That Provides Pay-Per-Use and Pay-Per-Hour Access to Range of Chip Design Software)", *Electronic Engineering Times*, (Nov. 6, 2000),3 pages.
Zemao, Chen et al., "A Malicious Code Immune Model Based on Program Encryption", *IEEE—Wireless Communication, Networking and Mobile Computing*, WICOM '08, 4th International Conference on Oct. 12-14, 2008,5 pages.
Mufti, Dr. Muid et al., "Design and Implementation of a Secure Mobile IP Protocol", *Networking and Communication, INCC 204*, International Conference on Jun. 11-13, 2004,5 pages.
Davida, George I., et al., "UNIX Guardians: Active User Intervention in Data Protection", *Aerospace Computer Security Applications Conference, Fourth* Dec. 12-16, 1988,6 pages.
Morales, Tatiana "Understanding Your Credit Score", http://www.cbsnews.com/stories/2003/04/29/earlyshow/contributors/raymartin/main55152.shtml *retrieved from the Intenet on Apr. 23, 2009*,3 pages.
"Achieving Peak Performance: Insights from a Global Survey on Credit Risk and Collections Practices", *GCI Group Pamphlet*, (2002, 2004),12 pages.
"Equifax Business Solutions—Manage Your Customers", *Retrieved from the Internet from* http://www.equifax.com/sitePages/biz/smallBiz/?sitePage=manage *Customers on Oct. 14, 2005*, 3 pages.
"Prequalification Using Credit Reports", *Retrieved from the Internet at* http://www.credco.com/creditreports/prequalification.htm on Oct. 14, 2005, 2 pages.
Gao, Jerry et al., "Online Advertising—Taxonomy and Engineering Perspectives", http://www.engr.sjsu.edu/gaojerry/report/OnlineAdvertising%20.pdf, (2002),33 pages.
Oshiba, Takashi et al., "Personalized Advertisement-Duration Control for Streaming Delivery", *ACM Multimedia*, (2002),8 pages.
Yue, Wei T., et al., "The Reward Based Online Shopping Community", *Routledge*, vol. 10, No. 4, (Oct. 1, 2000),2 pages.
"International Search Report and Written Opinion mailed Nov. 8, 2007", *Application No. PCT/US05/40967*, 5 pages.
Lampson, Butler et al., "Authentication in Distributed Systems: Theory and Practice", *ACM Transactions on Computer Systems*, v10, 265,(1992),18 pages.
"DMOD WorkSpace OEM Unique Features", www.dmod.com/oem_features, Retrieved from the Internet on Jan. 12, 2005,3 pages.
"Notice of Rejection mailed Jun. 7, 2011", *Japanese Application No. 2007-541361*, 3 pages.
"Office Action mailed Jun. 29, 2009", *Mexican Application No. MX/a/2007/005657*, 2 pages.
"Search Report Dated Jan. 11, 2008", *EP Application No. 05820090.8*, 7 pages.
"Examination Report mailed Mar. 5, 2008", *EP Application No. 05820090.8*, 1 page.
"First Office Action mailed Apr. 11, 2008", *Chinese Application No. 200580038813.9*, 11 pages.
"Office Action mailed Jun. 29, 2009", *Mexican Application No. MX/a/2007/005656*, 6 pages.
"Office Action mailed Nov. 30, 2009", *Mexican Application No. MX/a/2007/005659*, 6 pages.
"Notice of Allowance mailed Jul. 2, 2010", *Mexican Application No. MX/a/2007/005659*, 2 pages.
"Second Office Action mailed Dec. 18, 2009", *Chinese Application No. 200580038812.4*, 24 pages.
"Third Office Action mailed Apr. 1, 2010", *Chinese Application No. 200580038812.4*, 9 pages.
"Notice on Grant of Patent Right for Invention mailed May 5, 2011", *Chinese Application No. 200580038812.4*, 4 pages.
"Office Action mailed Jul. 7, 2009", *Mexican Application No. MX/a/2007/005660*, 8 pages.
"Notice of Allowance mailed Feb. 18, 2010", *Mexican Application No. MX/a/2007/005660*, 2 pages.
"Extended European Search Report mailed Aug. 13, 2010", *EP Application No. 05823253.9*, 7 pages.
"Notice on the First Office Action mailed Sep. 27, 2010", *Chinese Application No. 200580038745.6*, 6 pages.
"Office Action mailed Jul. 8, 2009", *Mexican Application No. MX/a/2007/005662*, 7 pages.
"Notice of Allowance mailed Feb. 19, 2010", *Mexican Application No. MX/a/2007/005662*, 2 pages.
"Partial Search Report mailed Jul. 23, 2010", *EP Application No. 05821183.0*.
"Extended European Search Report mailed Jan. 7, 2011", *EP Application No. 05821183.0*, 9 pages.
"Notice of Allowance mailed Dec. 25, 2009", *Chinese Application No. 200580038773.8*, 4 pages.
"Office Action mailed Jun. 26, 2009", *Mexican Application No. MX/a/2007/005655*, 5 pages.
"Office Action mailed Feb. 9, 2010", *Mexican Application No. MX/a/2007/005855*, 6 pages.
"Office Action mailed Sep. 24, 2010", *Mexican Application No. MX/a/2007/005655*, 3 pages.
"Extended European Search Report mailed Jan. 21, 2010", *EP Application No. 05819896.1*, 8 pages.
"Office Action mailed Mar. 19, 2010", *EP Application No. 05819896.1*, 1 page.
"Office Action mailed Feb. 10, 2010", *Mexican Applicaiton No. MX/a/2007/005656*, 5 pages.
"Office Action mailed Oct. 18, 2010", *Mexican Application No. MX/a/2007/005656*, 3 pages.
"Office Action mailed May 22, 2009", *Chinese Application No. 200580038771.9*, 5 pages.
"Notice on the First Office Action mailed Jul. 30, 2010", *Chinese Application No. 200680033207.2*, 7 pages.
"EP Search Report mailed Jan. 2, 2008", *EP Application No. 05109616.2*, 7 pages.
"Flonix: USB Desktop OS Solutions Provider, http://www.flonix.com", *Retrieved from the Internet Jun. 1, 2005*, (Copyright 2004),2 pages.
"Migo by PowerHouse Technologies Group, http://www.4migo.com", *Retrieved from the Internet Jun. 1, 2005*, (Copyright 2003),3 pages.
"WebServUSB, http://www.webservusb.com", *Retrieved from the Internet Jun. 1, 2005*, (Copyright 2004), 16 pages.
"Extended European Search Report mailed Dec. 6, 2010", *EP Application No. 058201773.3*, 8 pages.
"Forward Solutions Unveils Industry's Most Advanced Portable Personal Computing System on USB Flash Memory Device", *Proquest, PR Newshire*,http://proquest.umi.com/pqdweb?index=20&did=408811931&SrchMode=1&sid= 6&Fmt=3, Retrieved from the Internet Feb. 15, 2008,(Sep. 22, 2003),3 pages.
"Office Action mailed May 26, 2008", *EP Application No. 05109616.2*, 5 pages.
"Notice on Division of Application mailed Aug. 8, 2008", *CN Application No.200510113398.0*, (Aug. 8, 2008),2 pages.
"Notice on First Office Action mailed Dec. 12, 2008", *CN Application No. 200510113398.0*.
"The Second Office Action mailed Jul. 3, 2009", *CN Application No. 200510113398.0*, 7 pages.
"Notice on Proceeding with the Registration Formalities mailed Oct. 23, 2009", *CN Application No. 200510113398.0*, 4 pages.

"Examiner's First Report on Application mailed Jun. 4, 2010", *AU Application No. 2005222507*, 2 pages.
"Notice of Acceptance mailed Oct. 14, 2010", *AU Application No. 2005222507*, 3 pages.
"Decision on Grant of a Patent for Invention mailed Apr. 29, 2010", *Russian Application No. 2005131911*, 31 pages.
"Notice of Allowance mailed Nov. 13, 2009", *MX Application No. PA/a/2005/011088*, 2 pages.
"TCG Specification Architecture Overview", *Revision 1.2*, (Apr. 28, 2004),55 pages.
"International Search Report and Written Opinion mailed Jun. 19, 2007", *PCT Application No. PCT/US05/46091*, 11 pages.
"Notice on Grant of Patent Right for Invention mailed Jan. 29, 2010", *CN Application No. 200580040764.2*, 4 pages.
"International Search Report mailed Jan. 5, 2007", *Application No. PCT/US2006/032708*, 3 pages.
"Cyotec—CyoLicence", printed from www.cyotec.com/products/cyoicence on Sep. 7, 2005, (Copyright 2003-2005).
"Magic Desktop Automation Suite for the Small and Mid-Sized Buisness", printed from www.remedy.com/soultions/magic_it_suite.htm on Sep. 7, 2005, (Copyright 2005),4 pages.
"PACE Anti-Piracy Introduction", printed from www.paceap.com/psintro.html on Sep. 7, 2005, (Copyright 2002),4 pages.
"Office Action mailed Jul. 6, 2009", *MX Application No. MX/a/2007/005661*, 6 pages.
"Office Action mailed Oct. 1, 2010", *MX Application No. MX/a/2007/005661*, 3 pages.
"Office Action mailed Mar. 8, 2011", *MX Application No. MX/a/2007/005661*, 8 pages.
"Notice on Second Office Action mailed Jun. 7, 2010", *CN Application No. 200680030846.3*, 6 pages.
"Decision on Rejection mailed Sep. 13, 2010", *CN Application No. 200680030846.3*, 5 pages.
Kwok, Sai H., "Digital Rights Management for the Online Music Business", *ACM SIGecom Exhchanges*, vol. 3, No. 3, (Aug. 2002),pp. 17-24.
"International Search Report and Written Opinion mailed Mar. 21, 2007", *Application No. PCT/US05/46223*, 10 pages.
"The First Office Action mailed Oct. 9, 2009", *CN Application No. 200580043102.0*, 20 pages.
"Notice of Rejection mailed Jun. 13, 2011", *JP Application No. 2007-551270*, 4 pages.
"International Search Report and Written Opinion mailed Jul. 9, 2008", *Application No. PCT/US05/46539*, 11 pages.
"Notice of the First Office Action mailed Dec. 29, 2010", *CN Application No. 20580044294.7*, 9 pages.
"Office Action mailed Jul. 1, 2009", *MX Application No. 2007/a/2007/007441*.
"European Search Report mailed Aug. 31, 2011", *EP Application No. 05855148.2*, 6 pages.
"International Search Report and Written Opinion mailed Sep. 25, 2007", *Application No. PCT/US06/12811*, 10 pages.
"Examiner's First Report mailed Sep. 15, 2009", *AU Application No. 2006220489*, 2 pages.
"Notice of Acceptance mailed Jan. 25, 2010", *AU Application No. 2006220489*, 2 pages.
"The First Office Action mailed Aug. 22, 2008", *CN Application No. 200680006199.2*, 23 pages.
"The Second Office Action mailed Feb. 20, 2009", *CN Application No. 200680006199.2*, 9 pages.
"The Fourth Office Action mailed Jan. 8, 2010", *CN Application No. 200680006199.2*, 10 pages.
"The Fifth Office Action mailed Jul. 14, 2010", *CN Application No. 200680006199.2*, 6 pages.
"Notice on Grant of Patent mailed Oct. 20, 2010", *CN Application No. 200680006199.2*, 4 pages.
"First Office Action mailed Aug. 21, 2009", *CN Application No. 200680030846.3*, 8 pages.
"Notice of Rejection mailed Jul. 12, 2011", *JP Application No. 2007-541351*, 4 pages.
"Notice of Rejection mailed Jul. 22, 2011", *JP Application No. 2007-541362*, 4 pages.
"Notice of Rejection mailed Jul. 15, 2011", *JP Application No. 2007-541356*, 4 pages.
"Notice of Rejection mailed Jul. 26, 2011", *JP Application No. 2007-541352*, 5 pages.
"Notice of Rejection mailed Jul. 22, 2011", *JP Application No. 2007-541355*, 4 pages.
"Notice on the First Office Action mailed Dec. 11, 2009", *CN Application No. 200510127170.7*, 16 pages.
"Notice of Rejection mailed Jun. 21, 2011", *JP Application No. 2005-330496*, 6 pages.
"The Third Office Action mailed Jun. 5, 2009", *CN Application No. 200680006199.2*, 7 pages.
"Notice of Rejection mailed Sep. 9, 2011", *JP Application No. 2007-548385*, 9 pages.
"Notice of Rejection mailed Jul. 5, 2011", *Japanese Application No. 2007-541363*, 10 pages.
"Notice of Rejection mailed Aug. 5, 2011", *Japanese Patent Application No. 2007-552142*, 8 pages.
"International Search Report and Written Opinion mailed Apr. 25, 2007", *Application No. PCT/US05/40965*, 5 pages.
"International Search Report and Written Opinion mailed Sep. 25, 2006", *Application No. PCT/US05/40949*, 7 pages.
"EP Office Action Mailed Nov. 17, 2006", *Application No. 05110697.9*, 6 pages.
"EP Office Action mailed Apr. 5, 2007", *Application No. 05110697.9*, 5 pages.
"EP Summons to Attend Oral Proceedings mailed Sep. 27, 2007", *Application No. 05110697.9*, 7 pages.
"Decision to Refuse a European Application mailed Feb. 15, 2008", *Application No. 05110697.9*, 45 pages.
"International Search Report and Written Opinion mailed Sep. 8, 2006", *Application No. PCT/US05/40942*, 20 pages.
"European Search Report mailed Dec. 6, 2010", *Application No. EP/05820177*, 8 pages.
"Final Rejection mailed Jan. 17, 2012", Japanese Application No. 2007-552142.
"Notice of Rejection mailed Nov. 11, 2011", Japanese Application No. 2005-301957, 21 pages.
Utagawa, Mari et al., "Creation of Card Application by IC Card OS 'MULTOS' Which Can Rewrite Application", Interface, vol. 29, No. 3, ISSN: 0387-9569, CQ Publishing Co. Ltd., (Mar. 1, 2003), pp. 46-55.
"Extended European Search Report mailed Dec. 21, 2011", EP Application No. 05854752.2, 7 pages.
"Office Action mailed Dec. 7, 2011", JP Application No. 2008-528054, 7 pages.
"EP Office Action mailed Mar. 8, 2012", EP Application No. 05109616.2, 6 pages.

\* cited by examiner

SPECIAL PC MODE ENTERED UPON DETECTION OF UNDESIRED STATE

This application is a continuation-in-part of U.S. patent application Ser. No. 11/022,493, filed Dec. 22, 2004 which is a continuation-in-part of U.S. patent application Ser. No. 11/006,837, filed Dec. 8, 2004, which is a continuation-in-part of U.S. patent application Ser. No. 10/989,122, filed Nov. 15, 2004.

BACKGROUND

Operating systems are a key building block in the development of computing systems. Over the several decades since personal computing has become widespread operating systems have substantially increased in complexity. The development of a computer operating system that is backward-compatible to a substantial number of computer applications, but still is secure enough to achieve a high level of assurance of tamper resistance is extremely challenging. However, new business models for pay-per-use or pay-as-you-go computing require a high level of assurance of tamper resistance.

SUMMARY

A computer adapted for use in a pay-per-use business model may use a supervisor or isolated computing environment to monitor and measure performance of the computer, as well as compliance to a set of usage policies. The isolated computing environment may have a secure memory, a secure processing capability, and a cryptographic capability. The isolated computing environment may boot prior to other boot devices to establish a secure computing base before the introduction of non-secure computing capabilities to the computer, such as the operating system.

According to one aspect of the disclosure, the isolated computing environment may request data, receive data, or probe for information from the computer. The isolated computing environment may use the acquired data to develop a score for compliance with the policy established, for example, by a service provider. The score may increase as compliance with the policies is confirmed and the score may decrease as noncompliance is determined. Should the score reach or fall below a threshold level, a sanctioned mode may be invoked. The sanctioned mode, or alternate operating mode, may involve a simple warning to a user, may limit a function of the computer so the computer is less useful, or may stop the operating system or some other key component completely, thereby disabling the computer. When disabled, the computer may require service by a service provider or other authorized party for determination and correction of noncompliant conditions, and may include the user paying back service fees or penalties. The isolated computing environment may send notification data to a user or service technician to assist in determining the current state of the computer and corrective actions to take to restore the computer. Similarly, even in a non-sanctioned mode, the isolated computing environment may export data for monitoring or diagnostics.

DETAILED DESCRIPTION OF VARIOUS EMBODIMENTS

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts in accordance to the present invention, further discussion of such software and ICs, if any, will be limited to the essentials with respect to the principles and concepts of the preferred embodiments.

Figure 1:
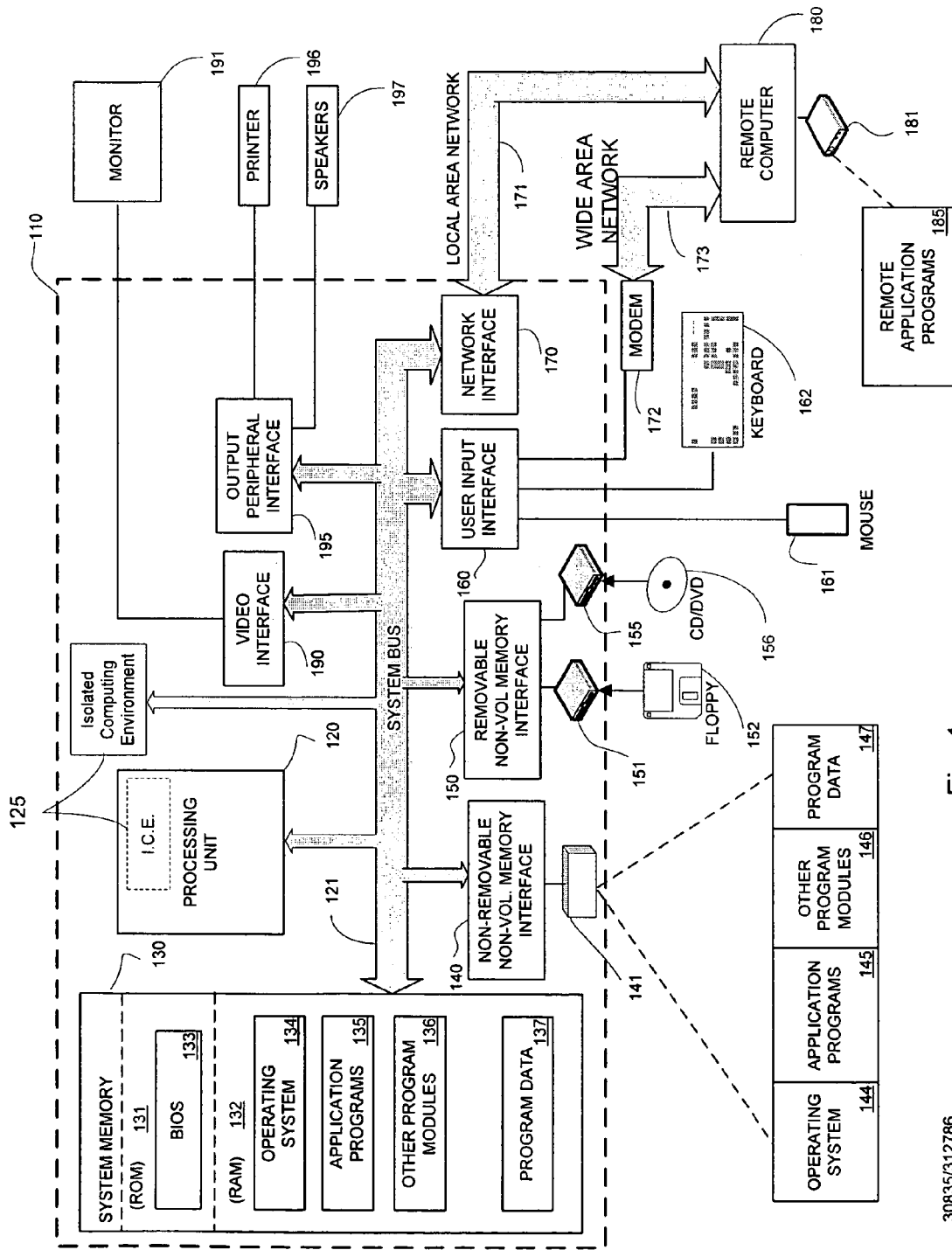
FIG. 1 is a simplified and representative block diagram of a computer.

FIG. 1 illustrates a computing device in the form of a computer 110. Components of the computer 110 may include, but are not limited to a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, FLASH memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

The communications connections 170 172 allow the device to communicate with other devices. The communications connections 170 172 are an example of communication media. The communication media typically embodies computer readable instructions, data structures, program modules or other data in a modulated data signal such as a carrier wave or other transport mechanism and includes any information delivery media. A "modulated data signal" may be a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Computer readable media may include both storage media and communication media.

An isolated computing environment 125 may be used to implement a supervisor, a trusted computing base, or other secure environment. and may be used to monitor, measure, and/or sanction the computer 110 when policies established for use are not followed. The policies may reflect the terms of an agreement between a user of the computer 110 and a service provider with an interest in the computer 110. The isolated computing environment 125 is discussed in more detail with respect to FIG. 2, below.

The isolated computing environment 125 may be instantiated in more than one manner. When implemented by one or more discrete components, the isolated computing environment 125 may be disposed on the motherboard (not depicted) of the computer. Ideally, the removal or de-lidding of the isolated computing environment 125 causes permanent damage to the motherboard and/or surrounding components and renders the computer 110 inoperable.

Another instantiation of the isolated computing environment 125 may be as depicted in FIG. 1, where the isolated computing environment 125 is incorporated in the processing unit 120. Being so disposed in the processing unit may offer advantages of better access to processing unit registers and monitoring of data sequences as well as improved resistance to physical attacks.

When an attested boot process exists, the isolated computing environment 125 may be implemented in software because the boot process can guarantee execution cycles and a certified operating environment. In such a case, the isolated computing environment 125 may not require a separate processor but may be run from the main processing unit 120. When an attested boot is not available, a hardware implementation of the isolated computing environment 125 may be recommended.

A license provisioning module, or LPM (see FIGS. 3 & 4), may be incorporated to measure and authorize use of the computer in a pay-per-use or pay-as-you-go configuration. The LPM, when implemented in software, may be stored in nonvolatile memory 146 and executed from memory 136. When the LPM is implemented in software, it may be vulnerable to attack. One purpose of the supervisor (see FIGS. 3 & 4) and/or isolated computing environment 125 may be to act as a watchdog over the LPM to help ensure its integrity and correct function.

In an alternate embodiment; the isolated computing environment 125 may assume the role of the LPM with respect to valid hardware configuration of the computer. That is, the separately-booted isolated computing environment 125 may have configuration data that allows operation of the computer according to its licensed capability, the licensed capability being less than that potentially available. For example, the computer may be capable of running with 512 megabytes (MB) of random access memory (RAM), but the valid configuration specifies 256 megabytes of RAM. The isolated computing environment 125 may limit the function of the computer to the 256 MB of system memory. Similar restrictions may be enforceable with respect to processor clock rate, available cache memory, number of cores of the processor 120 available, graphics card functions, hard drive capacity, networking options, or internal bus drivers. From an implementation perspective, there is little or no difference between imposing a limitation based on a monitored activity or enforcing a limitation based on a pre-determined setting or license.

Figure 2:
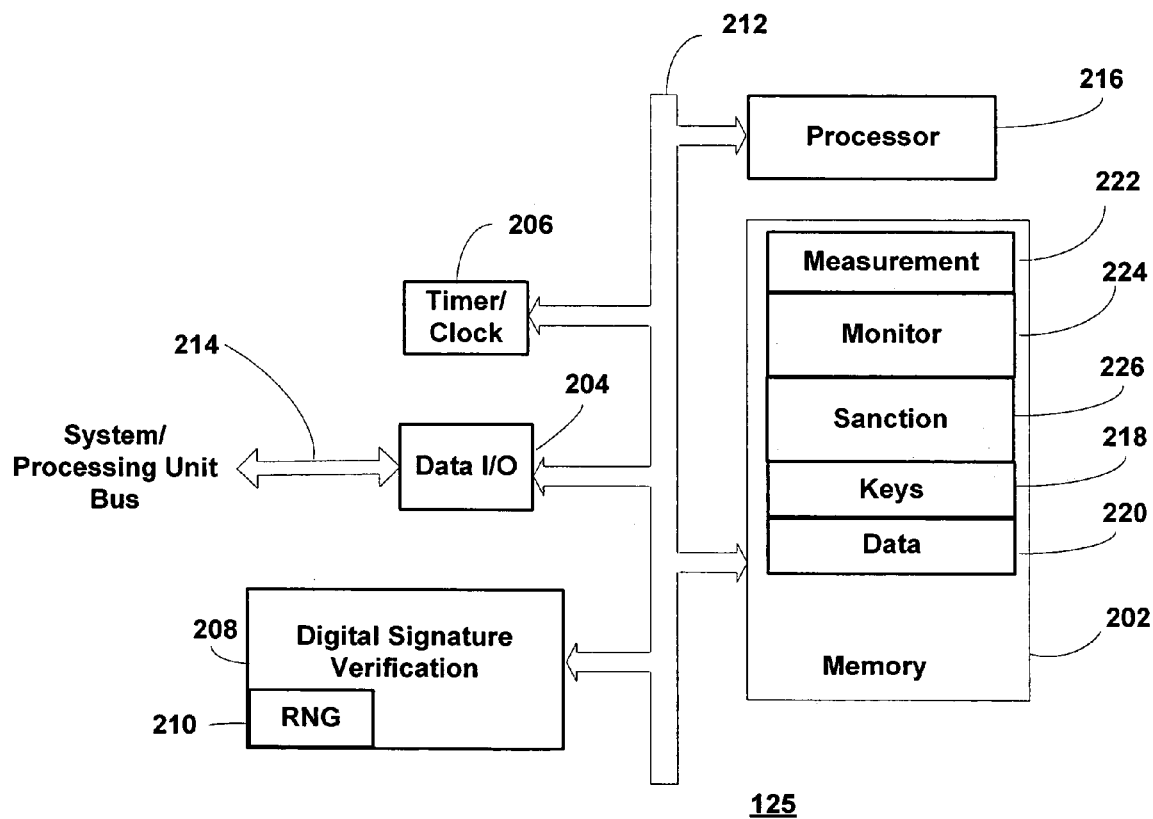
FIG. 2 is a block diagram of a simplified isolated computing environment.

Referring to FIG. 2, a simplified and representative isolated computing environment is discussed and described. The isolated computing environment may be or may be similar to the isolated computing environment 125 introduced above. The isolated computing environment 125 may include a memory 202, both volatile and non-volatile, a data input/output circuit 204 and a timer or clock 206. For example, a timer 206 may be used to implement the clock function by counting intervals of real time.

The isolated computing environment 125 may further include a digital signature verification circuit 208. When one-way verification of an external entity is required, for example, verification of a server (not depicted), a random number generator 210 may be a part of the digital signature verification circuit 208. Digital signature technology is well known and hashing, signature verification, symmetric and asymmetric algorithms and their respective keys are not discussed here in detail.

The blocks of the isolated computing environment 125 may be coupled by a bus 210. The bus 210 may be separate from a system or processing unit bus 214 used for external access. Separate busses may improve security by limiting access to data passed by bus 210. The bus 210 may incorporate security precautions such as balanced data lines to make power attacks on cryptographic keys 216 stored in the memory 202 more difficult.

A processor 216 may be available for execution of programs. As discussed above, when an attested boot is not available, the processor 216 may be included to provide the isolated computing environment 125 with guaranteed computing capability and separation from the operating system 134.

The memory 202, may, in addition to storing cryptographic keys 216, store data 220 that may include operational information, such as, a current score associated with compliance, or system information, such as, specific contractual information. Measurement data 222 may be associated with a monitor program 224. The monitor program 224 is discussed in more detail below, but briefly, is used to take measurements, receive information about the current operation of the computer 110, and determine a compliance score. The sanction program 226 may be invoked when the compliance score is below a pre-determined threshold. The sanction program 226 may be capable of triggering both software and hardware mechanisms for impairing or disabling the computer 110.

Figure 3:
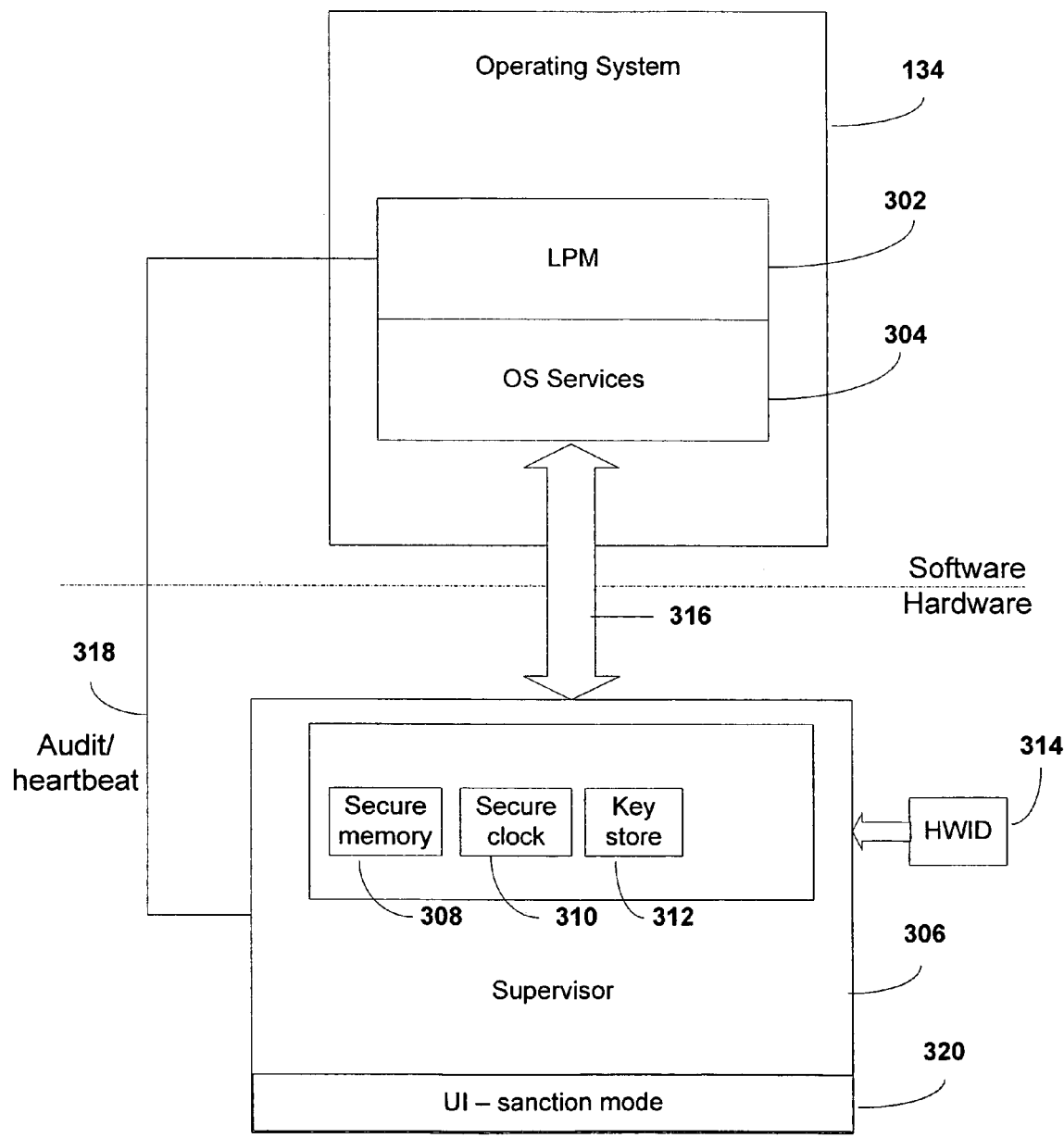
FIG. 3 is a simplified and exemplary block diagram illustrating an embodiment of a supervisor.

FIG. 3 illustrates an exemplary embodiment of a computer 110, showing the relationship hardware and software components associated with pay-per-use or pay-as-you-go computing. The operating system 134 of FIG. 1 may support the LPM 302 and operating system services 304 associated with the pay-as-you-go operation. The operating system services 304 may include secure time, secure store, and encrypt/decrypt. In this embodiment, elements of the isolated computing environment 125 are configured as a supervisor 306. The supervisor 306 may include a secure memory 308, a secure clock 310, and a cryptographic key store 312. A unique hardware identifier 314 may be available to the supervisor 306 for use in processing provisioning packets and in identifying the computer 110 to an outside entity.

The secure memory 308 may be a separate memory area accessible only by the isolated computing environment 125, and/or only after cryptographic authentication. The secure clock 310 may provide a tamper-resistant time base providing monotonically increasing time for the life of the computer. The secure clock 310 may be used for interval timing or as a calendar base. The cryptographic key store 312 may provide storage for cryptographic keys. The key store 312 may be essentially a write-only memory and include cryptographic algorithms such that calculations are performed within the key store and only results are provided. Keys may not be read from the key store 312 once written and verified.

The supervisor 306, and its underlying isolated computing environment 125, may operate independently of the operating system 134. For security reasons, the supervisor 306 may boot prior to any other boot device when the computer 110 is powered on or reset. Booting independently from the operating system helps ensure that the supervisor 306 and the isolated computing environment 125 are not spoofed or starved for CPU time by another boot device.

Communication between the supervisor 306 and the operating system services 304 for may be accomplished over logical communication link 316, and may be supported over physical communication bus 214. The LPM 302 may be in communication with the supervisor 306 as shown by logical link 318. The link 318 supports requests from the supervisor 306 to the LPM 302 for audit data. Additionally, the LPM 302 may send a periodic heartbeat to the supervisor 306 as an ongoing audit of system compliance. Because the supervisor 306 may completely disable the operating system 134 when a noncompliant situation is discovered, the supervisor 306 may have sufficient power and hardware access to present a sanctioned mode user interface 320 for use while the computer 110 is in the sanctioned mode.

The audit/heartbeat data may be sent over logical link 318 and may include data required to validate a software component, particularly the LPM 302. The supervisor 316 may be programmed to expect heartbeat data at a regular interval. The heartbeat data may include validation information such as a digital signature of its binary executable code, including a sequence number or other method for preventing a replay attack. The regular heartbeat, for example, from the LPM 302 may serve as evidence that the LPM is still running and when its signature is verified, that it is a correct version of the unmodified code. Should the supervisor fail to validate the authenticity of the heartbeat, or if the heartbeat does not arrive within a prescribed period, the heartbeat may fail and the compliance score may be reduced. Heartbeat messages that arrive more often than required may not be penalized, while a single failed heartbeat may not be sufficient to invoke a sanction, depending on the policy rules.

The supervisor 306 is different from a known hypervisor or monitor. A monitor may sit between the operating system and related hardware to negotiate resource sharing or CPU time slicing. Because a monitor is closely tied to the operating system, it is difficult to abstract a monitor to a variety of operating systems, or even operating system versions. In contrast, the supervisor 306, in one embodiment, does not attempt to manage or negotiate system resource usage during normal operation. In its simplest form, the supervisor 306 receives a policy, authenticates the policy, monitors for compliance, and sanctions noncompliance to the policy. The policy may be a data structure that is passed from the operating system corresponding to predetermined limits, for example, usage hours or calendar months of usage.

Because the supervisor 306 is independent of the operating system, or an other boot device, the supervisor 306 may be used to enforce policies for virtually any operating system or operating environment. This independence from the underlying platform is, in one embodiment, is facilitated by the supervisor's guaranteed access to computing cycles, secure memory, and time base.

Figure 4:
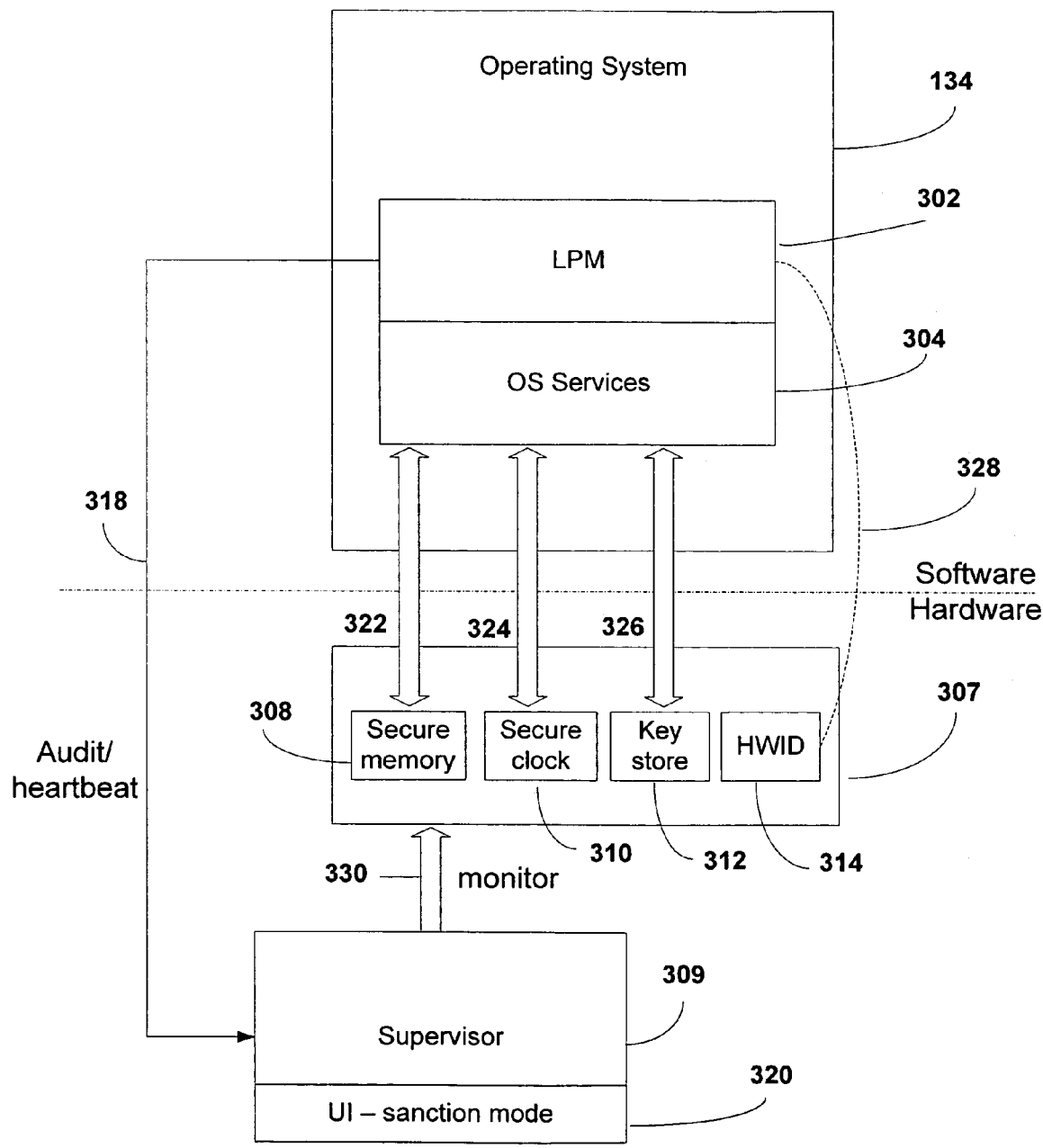
FIG. 4 is a simplified and exemplary block diagram illustrating another embodiment of a supervisor.

FIG. 4 depicts an alternate embodiment of the operating system and hardware components associated with a pay-per-use computer, such as computer 110. As in FIG. 3, the operating system 134 includes the LPM 302 and the underlying operating system services 304. A smaller supervisor 309, that also may also be based on a hardware isolated computing environment 125, may only monitor system secure resources 307 via bus 330, rather than offer and maintain them as in the embodiment of FIG. 3. The secure resources 307 may have secure memory 308, the secure clock 310, the cryptographic key store 312, and the hardware identifier 314. Individual service requests to the various operating system calling entities may be made via logical connections illustrated by data paths 322, 324, 326. The audit/heartbeat logical connection 318 may be maintained between the supervisor 309 and the LPM 302. In this configuration, the hardware identifier 314 may be made available to the LPM 302 via logical connection 328, among other things, for verifying provisioning packets and for use in generating the heartbeat signal.

In operation, both configurations as depicted in FIG. 3 and FIG. 4 may operate in a similar fashion with respect to developing a compliance score. The compliance score may be an accumulation of weighted values determined by measurement and observation. The measurements 222 performed by the monitoring process 224 (FIG. 2) may be used to evaluate different events and classify them, in the most simplistic form, as either good or bad. Each good event results in an improved compliance score, whereas each bad event decreases the compliance score. Criteria may be established such that no single event may be sufficient for the compliance score to reach a minimum threshold, causing sanctions to be imposed.

The supervisors 306 309 of the embodiments of FIG. 3 and FIG. 4 may both measure the frequency and quality of heartbeat signals. The compliance score may be increased when good heartbeats are received on time. The supervisor 306 of FIG. 3 may have full access to key data used in metering and measurement. For example, the compliance score may also increase when the monitor 224 determines: that the operating system is metering usage. The monitor 224 may also determined a tally of time used versus purchases of additional time. When the estimated purchases match the estimated usage, the compliance score may also be increased. Other measurements may be taken, such as verification of designated files, for example the LPM 302 or boot files (not depicted), or verification of the system clock.

However, when the heartbeat fails or does not arrive on time, the compliance score may be reduced. If the operating system persists in a non-metered state for a predetermined amount of time, the compliance score may be reduced. If the operating system enters and exits the metering state at too high a rate, indicating perhaps tampering with the metering circuits, the compliance score may also be reduced.

The supervisor 309 of the embodiment of FIG. 4 may have less access to direct metering data or the operating system state. Such a configuration may be more reliant on heartbeat monitoring or other factors such as the rate of change of secured storage as an indication that metering data is being updated.

The compliance score in any embodiment may start at initial value and increase or decrease as various 'good' and 'bad' measurements are determined. When the compliance score is decreased sufficiently a first threshold may be reached, triggering an action. In one embodiment, the first threshold may be the only threshold and an immediate sanction may be imposed. In another embodiment, the first threshold may trigger a warning advising the user that tampering concerns have been raised and appropriate action may need to be taken. In yet another embodiment, the first threshold may trigger a limited sanction, such as, limiting display resolution or reducing processor speed. Should the compliance score continue to decrease a threshold may be reached where a dramatic sanction such as disabling the operating system may be invoked. At that point, the computer 110 may need to be taken to a service center for restoration. The sanctioned mode user interface 320 may be activated for restoration services when the operating system is disabled.

To illustrate using an exemplary embodiment, a computer 110 may be given a starting compliance score of 80. After a series of successful heartbeats, a purchase of usage time, and routine metering, the compliance score may be increased to a maximum of 100 (other embodiments may not use a maximum compliance score limit). At that point however, the user attempts to defeat the metering mechanism by overwriting the LPM 302. A measurement of the LPM 302 fails because a hash of the destination memory range does not match an expected hash. The heartbeat signals stop and routine metering stops because the replacement LPM is not programmed to support those functions. With each successive measurement failure the compliance score may decrease, for example, to 70. When the compliance score reaches 70, a warning message is displayed to the user indicating that the system appears to have been tampered and will be shut down without corrective measures. The user ignores the warning and the compliance score decreases to 55. The supervisor 306 may then activate the sanction program 226 to take action to shut down the computer 110, for example, by halting the processing unit 120. The sanctioned mode user interface 320 may then pop up a message informing the user that the computer has been disabled and must be taken to a service center for restoration.

At the service center a technician may use the sanctioned mode user interface 320 to determine that the replacement LPM was not compliant and restore a compliant LPM 302. The service technician may trigger the supervisor 306 to restart the monitor 224 program, if required, and may be able to manually reset the compliance score, if desired. In this example, as someone clearly tampered with the computer, a fine or service charge may be imposed on the user to discourage future attempts at tampering with the system.

Figure 5:
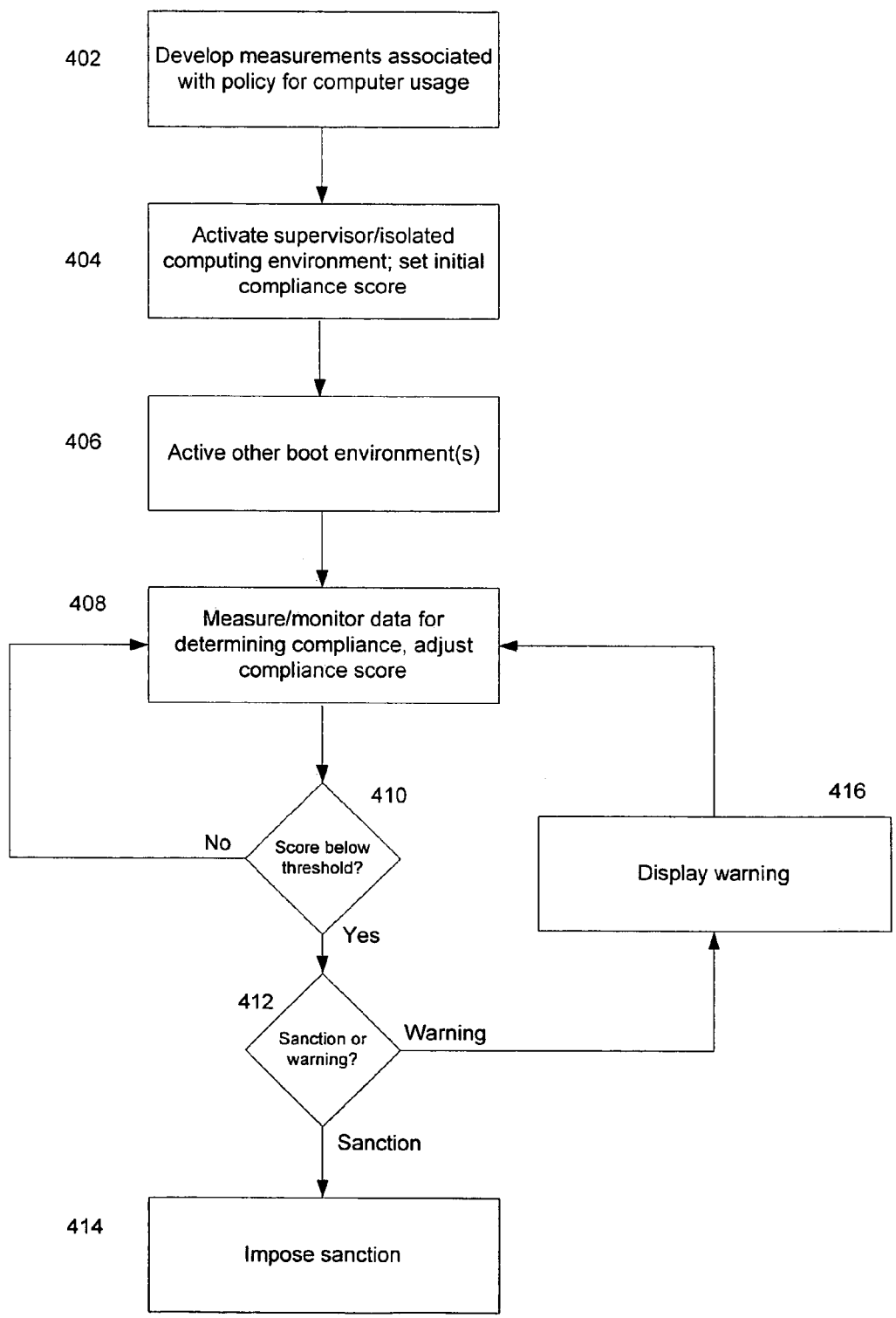
FIG. 5 is a flow chart depicting a method of establishing and measuring compliance to a policy on a computer.

FIG. 5, a method of determining non-compliance with a policy on a computer is discussed and described. A policy establishing rules of operation and usage criteria for a computer 110 may be established by a service provider or other party with a financial interest in the computer 110. After the policy has been established, measurable criteria for determining compliance or noncompliance with the policy may be developed 402. The criteria may include measurements such as hashing of known memory ranges and/or monitoring of conditions and activities on the computer 110, such as reprovisioning usage credits on the computer 110. The measurement and monitoring criteria may be programmed into a supervisor such as supervisor 306, which in turn may be built on an isolated computing environment 125.

The supervisor 306 may be activated 404 prior to activating, or booting, any other system element including an operating system 134. The reasons for first boot are discussed previously, but briefly, doing so helps to ensure a known, clean operating environment for the supervisor 306. When first activated, for example during manufacturing or at the time of installation, an initial compliance score may be established corresponding to operation in accordance with the established policy. In one embodiment, the supervisor 306 has a program execution environment autonomous from the operating system 134, to further isolate the supervisor 306 from attacks made on the operating system 134 and associated components.

After the supervisor 306 is booted, other boot devices may be started 406, such as the operating system 134 or any other early boot devices. When the computer 110 is operational, the supervisor 306 may begin monitoring and measuring 408 according to the critria developed at block 402. Each monitoring or measuring finding may be used to adjust the compliance score.

The criteria used at block 408 may include clock verification, the duration of a single computing session, the amount of time measured between provisioning packets were provided, or comparisons between the total time of operation of the computer in the total number of provisioning packets provided.

Metering and measurement data that may be used in evaluating the various criteria may be an operating system heartbeat, a verification of designated files, verification of a system clock, a current operating mode, a frequency of writes to the memory, or a time since last provisioning cycle. For example, clock verification may include a comparison of the secure clock time 310 to a soft clock under the control the operating system and may be followed by an analysis of the last time provisioning packets were provided.

As often as each measurement or monitoring result is determined, the compliance score may be compared 410 to a predetermined threshold. When the score is above the threshold, the no branch from block 410 may be taken back to block 408 where additional measurements may be taken. When the compliance score is below the threshold, the yes branch from block 410 may be taken and an additional test performed to determine 412 whether the score indicates a warning or a sanction is appropriate. When a warning is appropriate the branch labeled warning may be taken from block 412 and a warning displayed 416. Execution may then continue at block 408.

When it is determined at block 412 that a sanction is appropriate, the sanctioned branch from block 412 may be taken to block 414 where a sanction may be imposed. A range of sanctions may be available, including reducing display resolution, color depth, slowing the processor, and depending on the policy, the operating system may be deactivated or other major system or apparatus that substantially disables the computer 110.

Although the forgoing text sets forth a detailed description of numerous different embodiments of the invention, it should be understood that the scope of the invention is defined by the words of the claims set forth at the end of this patent. The detailed description is to be construed as exemplary only and does not describe every possibly embodiment of the invention because describing every possible embodiment would be impractical, if not impossible. Numerous alternative embodiments could be implemented, using either current technology or technology developed after the filing date of this patent, which would still fall within the scope of the claims defining the invention.

Thus, many modifications and variations may be made in the techniques and structures described and illustrated herein without departing from the spirit and scope of the present invention. Accordingly, it should be understood that the methods and apparatus described herein are illustrative only and are not limiting upon the scope of the invention.

We claim:

1. A computing device, comprising:
   a first memory device storing an operating system of the computing device;
   a tamper resistant memory device that is separate from the first memory device, the tamper resistant memory device storing a supervisory program;
   a processor coupled to both the first memory device and the tamper resistant memory device;
   when a user turns on the computing device, the supervisory program being booted up and readied for operation prior to a time when the operating system of the computing device starts running, the supervisory program having precedence over and operating independently of at least one other boot device in the computing device;

when the computing device is powered up and ready for use by the user on a pay per use or pay as you go basis, the supervisory program generating an initial compliance score that is representative of the computing device's compliance with a plurality of policies that indicate the operating system is metering usage of the computing device on the pay per use or the pay as you go basis;

while the computing device is being used on the pay per use or the pay as you go basis, the supervisory program:
receiving data that is representative of a then current operational state of the computing device,
calculating an updated compliance score, and
when the updated compliance score is less than a first threshold, invoking a first sanction mode that limits the ability of the computing device to be used on the pay per use or the pay as you go basis until the user takes corrective action that raises the value of the updated compliance score above the first threshold; and the supervisory program, during an interval of time for which the user has fully paid for use of the computing device, causing the computing device to enter a non-operational state when, during the interval of time, the supervisory program determines that the updated compliance score falls below a second threshold that is lower than the first threshold, wherein the operating system stored on the first memory device and the supervisory program stored on the tamper resistant memory device that is separate from the first memory device both execute on the processor concurrently, the supervisory program having guaranteed access to computing cycles on the processor while the processor is also executing the operating system that meters the usage of the computing device.

2. The computing device of claim 1, wherein the computing device comprises a personal computer.

3. The computing device of claim 1, the received data comprising an operating system heartbeat indicating that the operating system is metering the usage of the computing device.

4. The computing device of claim 1, wherein the received data indicates whether the computing device is operating in the first sanction mode.

5. The computing device of claim 1, wherein the received data comprises a time since a last provisioning cycle was executed.

6. A method implemented by a supervisory program on a computing device comprising a processor, the method comprising:
booting the supervisory program on the computing device independently from an operating system that also boots on the computing device;
generating an initial compliance score that is representative of compliance by the computing device with one or more policies that indicate the operating system is metering usage of the computing device;
receiving data that indicates whether the operating system is metering the usage of the computing device;
calculating an updated compliance score based on the received data;
in an instance where the updated compliance score is outside of a first threshold but not a second threshold that is different than the first threshold, invoking a first sanction mode that limits the ability of the computing device to be used on a pay per use or pay as you go basis until a user takes corrective action that changes the value of the updated compliance score to be within the first threshold;
in an instance where the compliance score is outside both the first threshold and the second threshold, causing the computing device to enter a non-operational state,
wherein the operating system is stored in a first memory device and the supervisory program is stored in a tamper resistant memory device that is separate from the first memory device; and
the operating system and the supervisory program both execute concurrently on the processor of the computing device, the supervisory program having guaranteed access to computing cycles on the processor while the processor is also executing the operating system.

7. The method according to claim 6, the second threshold being lower than the first threshold.

8. The method according to claim 6, the received data comprising a heartbeat indicating that the operating system is metering the usage of the computing device.

9. The method according to claim 8, the heartbeat being received at a regular interval.

10. The method according to claim 8, the heartbeat being received from a provisioning module that is supported by the operating system.

11. The method according to claim 10, the heartbeat comprising a digital signature of binary executable code of the provisioning module.

12. The method according to claim 6, the first sanction mode reducing a processor speed of the processor of the computing device.

13. The method according to claim 6, the first sanction mode limiting a display resolution of the computing device.

14. The method according to claim 6, the supervisory program booting before the operating system.

15. The method of claim 6, wherein the updated compliance score is further based on a comparison of a soft clock under control of the operating system to a secure clock time from a tamper resistant time base.

16. One or more computer-readable storage devices comprising executable instructions that perform the method of claim 6.

17. A method comprising:
generating an initial compliance score that is representative of compliance by a computing device with one or more policies that indicate an operating system of the computing device is metering usage of the computing device;
receiving data that indicates whether the operating system is metering the usage of the computing device;
calculating an updated compliance score based on the received data;
in an instance where the updated compliance score reaches a first threshold but not a second threshold that is different than the first threshold, invoking a first sanction mode that limits the ability of the computing device to be used on a pay per use or pay as you go basis until a user takes corrective action that changes the value of the updated compliance score;
in an instance where the compliance score reaches the second threshold, causing the computing device to enter a non-operational state,
wherein the operating system is stored on a first memory device and the generating, the receiving, the calculating, the invoking, and the causing are performed by a program that is stored in a tamper resistant memory device that is separate from the first memory device, and the operating system and the program both execute concurrently on a processor of the computing device, the program having guaranteed access to computing cycles on the processor while the processor is also executing the operating system.

18. The method according to claim 17, the non-operational state being entered by disabling the operating system.

19. The method according to claim 17, wherein the first sanction mode comprises slowing a clock speed of the processor.

20. One or more computer-readable storage devices comprising executable instructions that perform the method of claim 17.

* * * * *